March 5, 1935.  L. C. HUFF  1,993,446
PROCESS FOR THE TREATMENT OF HYDROCARBON DISTILLATES
Filed Nov. 13, 1930  2 Sheets-Sheet 1
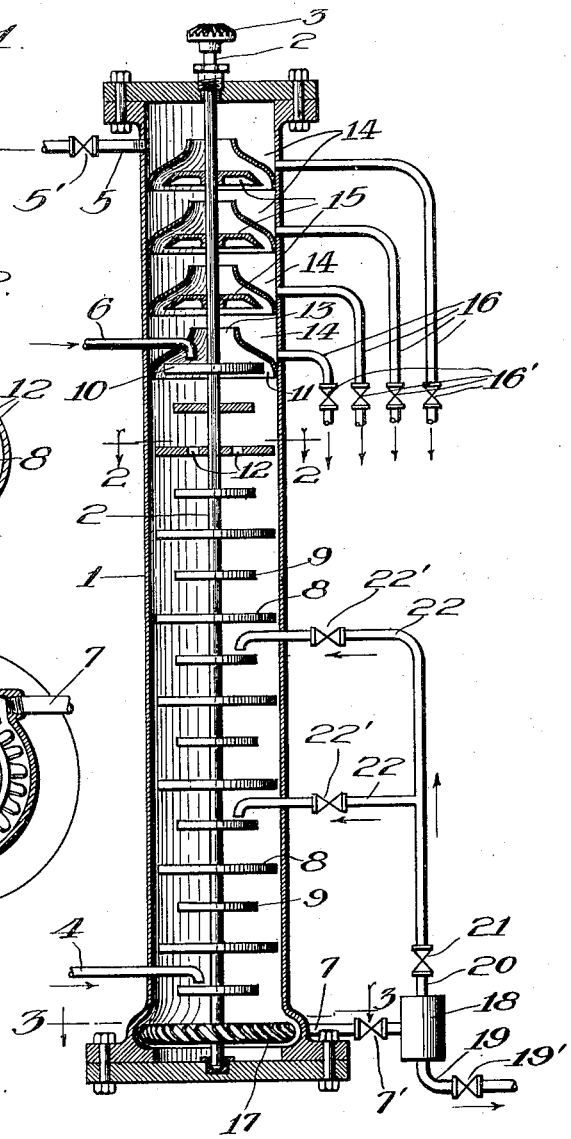

March 5, 1935. L. C. HUFF 1,993,446

PROCESS FOR THE TREATMENT OF HYDROCARBON DISTILLATES

Filed Nov. 13, 1930 2 Sheets-Sheet 2

Inventor:
Lyman C. Huff,
By Frank L. Belknap
Atty.

Patented Mar. 5, 1935

1,993,446

UNITED STATES PATENT OFFICE 1,993,446

PROCESS FOR THE TREATMENT OF HYDROCARBON DISTILLATES

Lyman C. Huff, Chicago, Ill., assignor to Universal Oil Products Company, Chicago, Ill., a corporation of South Dakota Application November 13, 1930, Serial No. 495,395

3 Claims. (Cl. 196—45)

This invention relates to the treatment of hydrocarbon oils, and refers more particularly to a method for the refining of hydrocarbon oil distillates.

In a specific embodiment of the invention, it provides a process which comprises treating distillates by the counter flow principle, utilizing centrifugal contacting and separation owing to the differences in the specific gravities of the distillate and the treating or washing agent. Various reagents may be used in the treatment of distillates in accordance with the provisions of my invention; for example, sulphuric acid, caustic solutions, plumbite solutions, and the like, in varying order of treatment and succession of steps, may be used.

In the drawings,

Fig. 1 shows a detail of one form of apparatus embodied by the invention consisting generally of a vertical cylindrical column or pipe in which is mounted a revolving element, said element consisting of a shaft upon which is mounted preferably alternate perforate and imperforate plates or discs, and which serve as contacting and separating surfaces for the reagent and the distillate to be treated on the one hand, and the treated distillate and the reaction products on the other.

Fig. 2 is a sectional plan view, taken along the line 2—2 in Fig. 1, showing one of the treating elements or discs, more specifically a perforate element.

Fig. 3 shows a detail of the impeller at the base of the treater, the view being taken along line 3—3 in Fig. 1.

Figure 4:
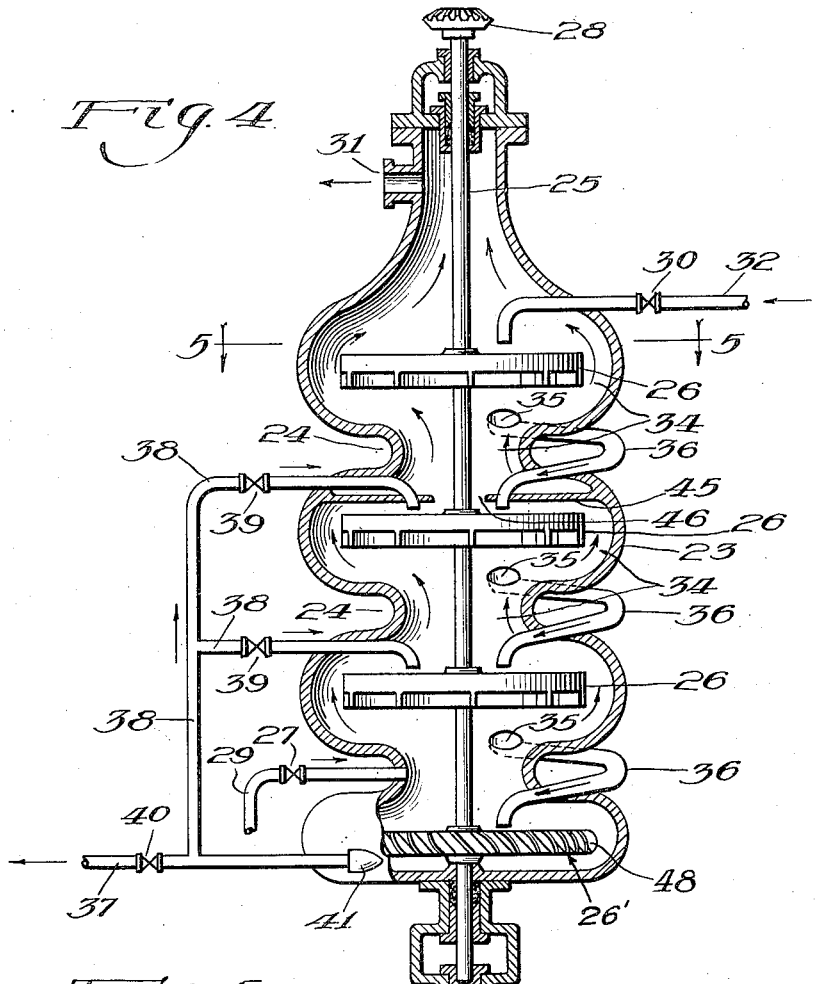
Fig. 4 shows, in vertical section, another form of apparatus of the invention which consists also of an outer shell enclosing a shaft upon which are mounted discs for contacting the reagents and the distillate to be treated.

Referring to Figs. 1, 2 and 3: The detail of the apparatus consists of a vertical cylindrical column or pipe 1 in which is mounted a revolving element or shaft 2, the latter being driven by any suitable means, such as a motor not shown through a gear 3 at the end of shaft 2. The distillate to be treated enters column 1 through connection 4, and flows upwardly, leaving the column at the top through connection 5, provdied with valve 5'. The treating agent, such as acid or caustic, enters column 1 through connection 6 and flows in a downward direction and is discharged through connection 7 provided with valve 7'. The revolving element 2 is fitted with a plurality of circular or hexagonal discs 8 and 9 which impart a whirling or centrifugal motion to the distillate rising through column 1. The treating agents, such as acid or caustic, enter through connection 6 and are discharged onto a similar imperforate disc 10 mounted on revolving element 2. The acid is, therefore, finely broken up and thrown, by centrifugal force, off the top of disc 10 through the rising column of distillate, and contacts with the inner surface of column 1 at a line around the circumference indicated at point 11. The treating agent, which usually has a higher specific gravity than the distillate being treated, is thrown outwardly and held in a thin film on the inner surface of column 1 and is given a whirling or rotating motion, first by having been thrown off the disc 10 and later by the column of distillate that is revolving within the cylinder 1.

It will, therefore, be seen that a film contact will be established between the distillate and the acid or treating agent. The acid or treating agent being of higher specific gravity and being in contact with the inner surface of the cylinder 1 will travel at a slower rate of speed than the whirling column of distillate which it surrounds and with which it is in contact. The treating agent will be thoroughly mixed as it revolves in a thin film within the column 1, continually exposing fresh surface to the distillate. On the other hand, the revolving column of distillate will be churned and mixed so that its outer film, which is contacting with the acid film, will also be continually changing, exposing fresh parts of the distillate to fresh parts of the acid.

The treating agent or acid, being of higher specific gravity than the distillate, will gradually travel downwardly along the inner surface of cylinder 1 as it whirls around this surface.

It will be seen that a counter flow principle is established between the distillate and the acid in that fresh distillate will first come in contact with spent acid as it enters the column and come in contact with fresh acid as it leaves the column. The principle of counter flow is very important in the treatment of distillates in that it permits the fresh distillate to first be treated by spent acid after which it is treated with increasingly stronger acid as it rises upwardly in the column.

The revolving discs 8 are made larger in diameter than similar discs 9 for the purpose of causing the distillate to come in closer contact with the acid film traveling along the inner circumference of the cylinder. The discs 8 or both discs 8 and 9 may be perforated with holes 12 so as to let the lighter portions of the distillate, which tend to hold to the center of the column, pass upwardly through the column. By imparting a centrifugal motion to the distillate as it is being treated, the heavier ends of the distillate are caused to go to the outer surface and there make contact with the acid film. The heavier ends of the distillate are, therefore, subjected to a more thorough treatment with the acid or treating agent than the lighter fractions.

The distillate, after passing adjacent to revolving disc 10 and being contacted with fresh acid, passes upwardly through restricted opening 13 into compartment 14 where it is given an increasingly whirling motion by discs 15 (which may be of larger diameter), causing the acid which may be carried through opening 13 with the distillate to be thrown out by centrifugal force and collected in the bottom of compartment 14 where it may be withdrawn through connection 16, provided with valve 16'. A plurality of discs 15, compartments 14, draw-off lines 16 and valves 16', may be provided, as shown, so as to effect a complete separation of the distillate and the treating agent as it passes out of the column 1 through connection 5.

As the treating agent or acid accumulates in the bottom of the cylinder 1, it is given an increased centrifugal motion by means of impeller 17 and is discharged through connection 7 into sludge receiver 18 where a part or all can be withdrawn from the system through connection 19 and valve 19', or regulated portions thereof again recirculated and returned to the column 1 through connections 20 and valve 21 and lines 22 controlled by valves 22'. In this way, the acid sludge can be recirculated into the column 1 at different elevations and thereby be caused to contact with the distillate being treated.

The treating apparatus as shown in Fig. 1 can also be used for washing the distillate after it leaves the first stage, in which event water may be introduced through line 6 instead of acid and it would leave through line 7. A counter current washing effect would thus be established wherein the distillate leaving the column will be brought in contact with fresh water. The distillate would also be freed of water by passing through compartments 14 in the upper part of the column where the water would be thrown out by the centrifugal force imparted to it by discs 15. It would be withdrawn from the various stages the same as the acid.

Figure 5:
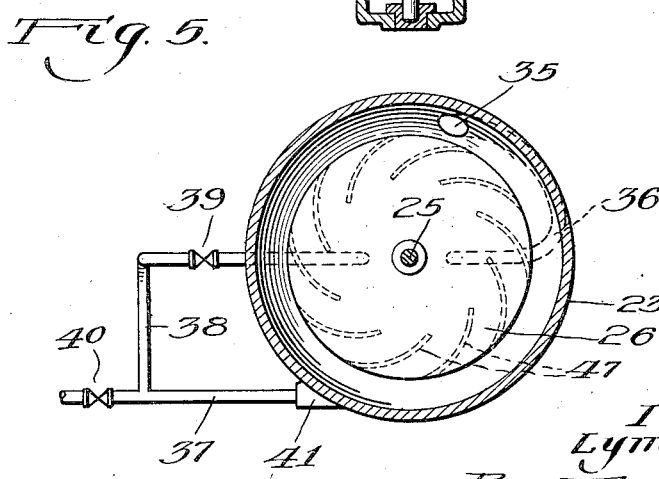
Fig. 5 is a horizontal section through the treater, taken along line 5—5 in Fig. 4, showing one of the contacting discs located therein.

Fig. 4 shows a sectional elevation through another form of contacting and mixing apparatus which may be used in this process, and Fig. 5 is a sectional plan view of the same apparatus taken along the line 5—5 in Fig. 4. It consists mainly of a vertical housing 23 having corrugations or indentations 24, the purpose of which will be later described, and a central revolving shaft 25 on which is mounted a number of discs 26, one above the other, said shaft being rotated by motor or other suitable means not shown through driving mechanism 28, at any desired speed.

The raw distillate to be treated is fed into the contactor through connection 29 controlled by valve 27 and rises upwardly in a general vertical direction, in the path indicated by arrows, while being treated, and is discharged through connection 31 at the top. The treating agent, such as sulphuric acid or the like, is introduced through connection 32, controlled by valve 30, onto the top of the uppermost revolving disc 26, where it is finely dispersed by being thrown off the edge of the disc. As it is thus thrown off the disc in a finely divided form, it is brought into contact with the rising column of distillate, which passes upwardly through the restricted channels 34. The treating agent or acid after being thrown from the disc 26 and after contacting with the rising column of distillate is caused to collect by centrifugal force in pockets 35, and is diverted through connection 36 onto the next lower revolving disc 26, where it is again caused to be finely dispersed by being thrown off the disc in a like manner as above described. In this manner, the acid is caused to pass from one disc to the next lower disc, and at each one contacting with the rising column of distillate until it reaches the lowest disc 26', which may have impeller blades 48 around its circumference, to assist in withdrawal of the acid through line 37 and, more particularly, recirculation of the acid to the treater. A portion or all of the acid can be returned to the preceding stages through connections 38 provided with valves 39 for recontacting with the distillate and the remainder, or all of the acid if desired, may be withdrawn from the system through valve 40 in line 37.

It is proposed that the connections between the intervening stages such as 36 and also the connection at 37 be located in such a way that the acid will be taken off tangential to the housing, as indicated at 41 in Fig. 5.

By this means, it will be seen that a quick and intimate contract of the acid and the distillate will be established. In addition to the distillate contacting with the acid as the latter is thrown off the edge of the disc there will be a certain amount of eddying or recirculation, which will cause the distillate to contact with the thin film of acid spread out over the top of disc 26. It is proposed that such recirculation be taken advantage of in the lower stages, but in the upper stages it may not be advisable, in which case it may be prevented by the installation of baffles, as indicated at 45, which would cause the distillate to pass upwardly through opening 46, as indicated by the arrows.

It is also proposed that the discs 26 may be provided with vanes on their surfaces, preferably the under surface as indicated at 47, in order to cause the distillate to be projected in an angular direction and with greater force from the edge of the discs, causing better mixing of the acid and the distillate.

Corrugations or indentations 24 in the housing are provided to cause the distillate to flow inwardly towards the shaft 25 after contacting with the acid leaving the edge of the disc, and also to provide a small reservoir in which the acid may collect and be concentrated preparatory to passing through recess 35 and line 36 to the stage below.

A similar device to that shown in Fig. 4 may be used for washing the distillate after it has been treated. In this case, the fresh water would enter at the acid inlet 32 and be withdrawn through the acid outlet 37. The distillate to be washed would enter at connection 29 and leave at connection 31. The washing agent would, therefore, pass through the system in a similar manner to the acid as above described, which would result in intimate mixing and contacting of the water and the distillate in strictly counter current form.

The individual treaters shown and described may be used in sequence as elements of a treating system, particularly a continuous treating system; for example, a cracked distillate is to be treated with sulphuric acid: The distillate and acid are fed, as described, into one of the forms of treating elements shown. The sludge is removed and the distillate caused to flow into a second treating element of the same type wherein it is water washed. In like fashion, the water is withdrawn and the distillate is caused to overflow into a succeeding similar treating element, wherein it is treated with a caustic solution, plumbite solution, or the like. Finally, the distillate is given a water wash in another similar treating element and the treated distillate is sent to storage.

The example given herein is illustrative of the manner in which my treating elements may be applied to the treatment of distillates, and the particular example given serves only to illustrate the general application of my invention.

I claim:

1. A process for the treatment of hydrocarbon distillates which comprises passing a distillate upwardly through a vertical treating zone, passing a liquid treating agent downwardly through said zone, contacting distillate and treating agent in a number of distinct stages within the zone and imparting a whirling motion to the contacting distillate and treating agent passing through the zone, withdrawing treating agent from the zone in a tangential direction at one level and returning it thereto at a lower adjacent level.

2. A process for the treatment of hydrocarbon distillates which comprises passing a distillate upwardly through a vertical treating zone, passing a liquid treating agent downwardly through said zone, contacting distillate and treating agent in a number of distinct stages within the zone, withdrawing treating agent from the treating zone by the influence of centrifugal force imparted thereto within the zone and utilizing said centrifugal force to return withdrawn treating agent to the treating zone.

3. A process for the treatment of hydrocarbon distillates which comprises passing a distillate upwardly through a vertical treating zone, passing a liquid treating agent downwardly through said zone, contacting distillate and treating agent in a number of distinct stages within the zone, withdrawing treating agent at the bottom of the treating zone by the influence of centrifugal force imparted thereto within the zone, and utilizing said centrifugal force to return withdrawn treating agent to the treating zone at a higher level.

LYMAN C. HUFF.